(12) United States Patent
de la Cierva Hoces (10) Patent No.: US 7,918,415 B2
(45) Date of Patent: Apr. 5, 2011

(54) CONVERTIBLE AIRCRAFT OPERATING METHOD

(75) Inventor: Juan de la Cierva Hoces, Madrid (ES)

(73) Assignee: Industria Helicat y Alas Giratorias, S.L., Barcelona (ES)

( * ) Notice: Subject to any disclaimer, the term of this patent is extended or adjusted under 35 U.S.C. 154(b) by 0 days.

(21) Appl. No.: 10/598,592

(22) PCT Filed: Feb. 28, 2005

(86) PCT No.: PCT/ES2005/000092
§ 371 (c)(1),
(2), (4) Date: Mar. 5, 2007

(87) PCT Pub. No.: WO2005/087588
PCT Pub. Date: Sep. 22, 2005

(65) Prior Publication Data
US 2007/0170307 A1    Jul. 26, 2007

(30) Foreign Application Priority Data
Mar. 5, 2004    (ES) .................................. 200400538

(51) Int. Cl.
| B64C 27/02 | (2006.01) |
| B64C 27/24 | (2006.01) |
| B64C 27/26 | (2006.01) |
| B64C 37/00 | (2006.01) |
| B64C 27/28 | (2006.01) |

(52) U.S. Cl. .......................................... 244/7 R; 244/8
(58) Field of Classification Search .............. 244/2, 7 R, 244/7 A, 7 C, 8, 17.11
See application file for complete search history.

(56) References Cited

U.S. PATENT DOCUMENTS

| 1,590,497 | A |   | 6/1926  | de la Cierva |          |
| 1,792,014 | A |   | 2/1931  | Herrick      |          |
| 1,947,901 | A |   | 2/1934  | de la Cierva |          |
| 2,702,168 | A |   | 2/1955  | Platt        |          |
| 2,964,263 | A | * | 12/1960 | Arena        | 244/6    |
| 3,490,720 | A | * | 1/1970  | Girard       | 244/7 R  |
| 3,563,496 | A | * | 2/1971  | Zuck         | 244/7 A  |

(Continued)

OTHER PUBLICATIONS

EPO Action.

(Continued)

*Primary Examiner* — Tien Dinh
*Assistant Examiner* — Richard R Green
(74) *Attorney, Agent, or Firm* — Collen I P; Donald J. Ranft (57) ABSTRACT

The invention relates to a convertible aircraft operating method. According to the invention, the aircraft comprises: a fuselage, standard fixed wings which are equipped with ailerons, a tail unit with flight-control surfaces, engines, a rotor with blades, a transmission which is placed between the engines and the rotor and which is equipped with rotor clutch and braking means, a landing gear, means for transition from helicopter mode to autogyro mode and vice versa, and means for direct or reverse transition from autogyro/helicopter mode to aeroplane mode. The lift for a range of low speeds is produced by means of the rotor, while the lift for a range of high speeds is produced by means of the wings. In addition, the lift for a range of intermediate speeds can be produced using the wings and the rotor in autogyro mode simultaneously, and take-off and landing can be performed in autogyro mode or in helicopter mode with the engines coupled to the rotor. The aircraft comprises a hybrid helicopter/autogyro/aeroplane aircraft and, as such, can perform the direct or reverse transition to aeroplane mode from both helicopter mode and autogyro mode.

9 Claims, 4 Drawing Sheets

U.S. PATENT DOCUMENTS

| | | | |
|---|---|---|---|
| 3,582,021 A | * 6/1971 | Pender | 244/7 A |
| 3,647,315 A | * 3/1972 | Rostad et al. | 416/31 |
| 3,986,686 A | * 10/1976 | Girard | 244/7 A |
| 4,793,572 A | * 12/1988 | Mecca | 244/7 R |
| 5,085,315 A | * 2/1992 | Sambell | 244/7 R |
| 5,727,754 A | 3/1998 | Carter, Jr. | |
| 5,915,649 A | * 6/1999 | Head | 244/7 A |

OTHER PUBLICATIONS

International Search Report for PCT/ES 2005/000092.

\* cited by examiner

CONVERTIBLE AIRCRAFT OPERATING METHOD

TECHNICAL FIELD OF THE INVENTION

The invention generically relates to convertible aircrafts, of the type which comprise a fuselage, standard fixed wings equipped with ailerons, a tail unit with rudders, propulsion engines, a rotor with blades, a transmission between the engines and the rotor, equipped with braking and rotor clutch means, a landing gear and means for transition from helicopter mode to autogyro mode and vice versa.

The purpose of the invention is an operating method for a convertible aircraft which comprises a transition from helicopter mode to autogyro mode and vice versa, as well as the convertible aircraft that uses said method.

BACKGROUND OF THE INVENTION

U.S. Pat. No. 1,590,497 and U.S. Pat. No. 1,947,901, by Juan de la Cierva y Codorníu, amongst others, define and protect the autogyro, which is a machine equipped with rotary wings that obtains its main lift in flight from the reaction of air on a system of aerofoils or rotors capable of rotating freely. Thus, one could say that the autogyro is an aeroplane equipped with propeller-shaped wings, articulated on a vertical axis, which rotate as a consequence of air resistance during the machine's forward movement and act as lifting elements.

From the time that the autogyro was invented by Juan de la Cierva y Codorníu in Madrid in 1923 up to the present, all designers of rotary wing machines, primarily autogyros and helicopters, have attempted to expand these machines' range of speeds in order to make them comparable to those of fixed wing aeroplanes. Starting with the first autogyro models, particularly those designed in the United States, they were hybrid designs wherein standard wings intended for high-speed flight co-existed with the rotor, the basic element for providing lift at low speeds.

The efforts to achieve high flight speeds in rotary wing machines have been hindered by the basic fact that a rotor in flight, at relatively high speeds, exhibits a very asymmetric profile in the lift generated by the rotor blade when it "moves forward" in the wind produced by the aircraft's forward flight and when it "moves backward" in that same wind, the opposite side of the rotor disc.

This asymmetric flight profile is very visible if the velocity (with respect to the wind) of the external tip of the rotor blade is analysed. It is easy to see that, when the blade is in a position of maximum forward movement, the velocity is the sum of the aircraft's rotational and translational velocities. On the contrary, when the blade is on the opposite side, the velocity thereof is the difference between both velocities.

Therefore, when a rotary wing aircraft attempts to fly at high speeds, it is possible that the tip of the blade exceeds the speed of sound on the blade that moves forward and/or suffers losses on the blade which moves backward, which leads to highly undesirable effects in the rotor's behaviour.

This factor has limited the maximum speed of rotary wing aircrafts (autogyros and helicopters) to slightly over 350 km/h. This is in contrast with the speed of over 1,000 km/h commonly achieved by fixed wing aircrafts, including civil air transport. This speed is slightly below the speed of sound in air, which at sea level is about 330 m/s, equivalent to about 1,200 km/h.

Numerous military aeroplanes and some civil ones (such as the "Concorde") reach supersonic speeds, but at the expense of substantial increases in consumption, noise, heating of the fuselage and several other characteristics.

In rotary wing aircrafts, the asymmetry in the lift of a rotor in flight also generates an asymmetric effect due to the "loss of speed" in internal sections of the tips of the blades. Thus, the linear velocity produced by the rotation decreases with the radius, whereas the translational velocity remains constant. For this reason, the area of each blade wherein the velocity falls below the stall velocity is greater when the aircraft's translational velocity increases. The entry into "loss" ("stall" in the field) of an increasingly larger part of the blade that moves backward in the forward wind also produces an asymmetry in the lift of the rotor.

The limited maximum speed of rotary wing aircrafts presents serious restrictions for the use thereof. It is evident that the main incentive—the raison d'être—of these aircrafts is their capacity for slow, stationary flight, as well as their capacity for taking off and landing in a space limited to a size that is slightly larger than the aircraft and the rotor thereof. But many of the civil or military missions wherein helicopters are involved consist of transporting persons and/or cargo between two points, one or both of which may not be equipped with take-off or landing infrastructures. In these cases, the low maximum and cruise velocities of autogyros and helicopters lead to long transport times, which greatly limits their practical use for many missions.

During the eighty years that have elapsed since the birth of rotary wing aviation, there have been numerous attempts to break the high-velocity barrier in these machines. Without exception, they have all been based on hybrid designs composed of wings and a rotor, with the intention to transfer the lift from the rotor at low speeds to the wings at higher speeds. These aircrafts are known as convertible or hybrid aircrafts, or "convertiplanes".

Thus, currently a large number of convertible aircraft embodiments are known, composed, in a well-known manner, by a fuselage, standard fixed wings equipped with ailerons, a tail unit with rudders, engines, a rotor with blades, a transmission between the engines and the rotor, equipped with braking and rotor clutch means, and a landing gear.

Below we list and describe a substantial part of these embodiments, which, as a whole, define the closest state of the art.

U.S. Pat. No. 1,792,014, by G. P. Herrick, describes an aircraft of this type with lifting wings in a normally fixed position with an assembly that allows for the rotation thereof according to essentially horizontal planes in the form of a lifting propeller driven by moving air and with pivoting movements with respect to the rotational axis. This aircraft also has retention means to retain the wing in a fixed position without the possibility to rotate, retention means to maintain the wing in position with respect to the pivoting, and release means for both retention means at the pilot's discretion, as well as means to drive the aircraft through the air.

Therefore, this aircraft of U.S. Pat. No. 1,792,014, the practical commercial version whereof was called "Herrick HV2A" convertiplane, was an aircraft that could fly as an autogyro and as an aeroplane with the rotor stopped in a transverse position, making several in-flight transitions between the two modes. The HV2A is, evidently, an attempt to overcome autogyros' speed limitations. Its maximum velocity was 160 km/h.

The "Fairey Gyrodyne" is a convertible aircraft, designed by Fairey Aviation Ltd. in Great Britain in 1946. This convertible aircraft is a hybrid aircraft between a helicopter and an autogyro that uses a propeller on the port side which serves to compensate for the torque generated upon applying power to the rotor. In autogyro mode for rapid flight, the same propeller serves to provide thrust to the aircraft. The aircraft reached a maximum velocity of 200 km/h, which at the time, 28 Jun. 1948, set a world record for rotary wing aircrafts.

The original Gyrodyne was extensively modified to be converted into the Jet Gyrodyne (1953) in order to study the principle of jet propulsion of the blades conceived for the Rotodyne, which is described further below. Although the modified Jet Gyrodyne maintained the general configuration of the Gyrodyne, it mounted a two-blade rotor with augmentors on the tips to replace the previously used three-blade type and was equipped with two propellers. Two compressors of the type used in the Rolls-Royce Merlin engine supplied compressed air to the tips of the rotor, which rotated freely, and a Leonides engine was used solely to move the two Fairey variable-pitch driving propellers mounted on the tips of the wings. No data have been found regarding the maximum velocity reached by this design.

Given the positive result of the Jet Gyrodine, the proposal by Doctor J. A. J. Bennet, one of Juan de la Cierva's main collaborators, and Captain A. G. Forsyth, formulated in 1947, to build a large convertiplane, seemed to be promising. In December 1951, British European Airways requested a 30-40-seat machine for short and medium routes, and Fairey submitted a proposal which more or less corresponded to its ideas. It was accepted and, in 1953, the English Ministry of Supplies granted it a contract to build an experimental prototype. The system of trials consisted of a main rotor, the two turbines, wings, etc., and the controls were installed in a compartment located in the approximate position of the nose. Exhaustive tests were conducted whilst the prototype was being built. The Rotodyne made its first flight as a helicopter on 6 Nov. 1957, and the first transition to horizontal flight took place in mid-April of the following year. The Rotodyne had an orthodox quadrangular-section fuselage with short, rectangular wings whereon the Eland turbines were mounted. The tricycle landing gear was retracted inside the engine nacelles. A double fin, subsequently completed with another, central one, was mounted on the tips of the tail aerofoil, which had a rectangular plan and was installed in a high position. Vertical take-off was achieved thanks to a large "four-blade" rotor, with jet propellers on the tips, which were fed with compressed air purged from the turbines and mixed with fuel. They were possibly ram-jet engines. Each turbine fed two opposite blades in order to avoid asymmetries in the event of failure of an engine.

On 5 Jan. 1959, the Rotodyne beat the world record for rotary wing aircraft velocity for convertiplanes in a 100-km closed circuit, setting it at 307.2 km/h.

U.S. Pat. No. 2,702,168, applied for in 1950, discloses a convertible aircraft which may fly in helicopter mode and in aeroplane mode, equipped with wings that extend on both sides of the fuselage, with rotors mounted on the wings capable of oscillating around a horizontal axis, with the possibility to modify the angle of attack and the thrust vectors of said rotors differentially with respect to one another. The practical embodiment of the aircraft disclosed in this patent is Bell-Boeing's V-22 Osprey, which resolves the problems of lift asymmetry in the rotor (or rotors) at high flight speeds, making the same rotors transform in flight in such a way that they act as high-velocity tractor propellers.

This convertible aircraft has a cruise velocity of 432 km/h and the different United States army forces have ordered several hundred units. The maximum velocity achieved by the V-22 Osprey is 510 km/h.

U.S. Pat. No. 5,727,754, by Carter Copter discloses a convertible or hybrid aircraft between an autogyro and an aeroplane, equipped with an autogyro rotor, a variable-pitch driving propeller for propulsion, and wings with a relatively small surface area. The CarterCopter is a convertiplane that is in the process of development in the United States on the date of filing of this patent.

The CarterCopter company has announced its intention to reach high maximum velocities using a technology, called "$\mu$–1", where $\mu$ is the ratio between the forward velocity of the tip of the rotor blade and the linear velocity of the CarterCopter. Carter maintains that, for $\mu$ values greater than 1, corresponding to high aircraft velocities, the lift comes solely from the CarterCopter wings and the drag of the rotor, self-rotating at a very low rotational velocity, is also very low, which will allow the aircraft to reach high forward velocities whilst the rotor continues to self-rotate at a low rotational speed and remains stable, assisted by masses installed inside the blades close to the tip.

At the date of this patent, the $\mu$–1 theory has not been verified in flight. The prototype has as yet not reached sufficient velocity to be tested.

As will be shown, all the attempts described, based on hybrid designs composed of wings and a rotor, with the intention of transferring the lift from the rotor at low speeds to the wings at higher speeds, are limited to autogyro aeroplane, helicopter-aeroplane and autogyro helicopter dual hybrids or combinations.

It seems evident that an aircraft which may operate at low or zero velocity as a helicopter, but may reach maximum speeds that are much higher than those of current helicopters, as well as the in-flight safety characteristic of the autogyro, would find a substantial niche in both civil and military markets, filling the void in the current state of the art.

The purpose of this invention is to provide a new convertible aircraft embodiment, as well as an operating method for this aircraft, which resolves the problem posed and fills the above-mentioned void.

DESCRIPTION OF THE INVENTION

To this end, in one respect, the purpose of the invention is a new operating method for convertible aircrafts of the type indicated at the beginning, which, in essence, is characterised in that the method comprises a direct and reverse transition from helicopter mode to autogyro mode and a direct and reverse transition from autogyro helicopter mode to aeroplane mode, the direct transition from helicopter mode to autogyro mode comprising the following stages:

disengaging the clutch of the rotor from the rotor's propulsion engines, and the direct transition from autogyro helicopter mode to aeroplane mode comprising the following stages:

adjusting the collective and cyclic pitches of the rotor blades to essentially zero degrees, in such a way that they cease to lift and control the aircraft and the latter is lifted and controlled by the ailerons and the rudders;

quickly reducing the rotor's rotational velocity using the brake thereof;

stopping the rotor in a transverse position of at least two of its blades in a position essentially transverse to the direction of flight;

retracting the rotor blades towards the stern of the aircraft, until their longitudinal axis is aligned with the direction opposite that of the aircraft's movement;

rotating at least one of the rotor blades to approximately 180° on the pitch axis thereof.

deploying the rotating blades, independently from one another, to an azimuthal position determined by a pre-determined range of angles; and adjusting the angle of attack of the deployed rotating blades in such a way that they are placed on the aircraft's standard fixed wings, and the reverse transition comprising the above-mentioned steps executed in the reverse sequence and with the opposite actions.

According to a second aspect of this invention, a convertible aircraft is provided for the execution of the method described, which, in essence, is characterised in that the aircraft's rotor is equipped with driving means for the direct and reverse transition from autogyro helicopter mode to aeroplane mode, which comprise:

an engine designed to regulate the collective and cyclic pitches of the rotor blades to essentially zero degrees, in such a way that they cease to lift and control the aircraft and the latter is lifted and controlled by the ailerons and the rudders;

means to stop the rotor in a transverse position of the blades in a position essentially transverse to the direction of flight;

an engine designed to retract and deploy the rotor blades towards and from the stern of the aircraft, which allows to retract the blades until their longitudinal axis is aligned with the direction opposite that of the aircraft's movement, and deploy them to an azimuthal position determined by a pre-determined range of angles; and an engine to rotate at least one of the rotor blades to approximately 180° on the pitch axis thereof.

Those skilled in the art will note that the new, inventive characteristics of the method of this invention allow to provide a hybrid aircraft with three-fold helicopter-autogyro aeroplane functionality. In fact, the lift for a range of low speeds is produced by means of the rotor, and the lift for a range of high speeds is produced by means of the fixed wings; the lift may also be produced, for a range of intermediate speeds, by means of the wings and the rotor in autogyro mode, simultaneously. Take-off and landing may be performed in autogyro mode or in helicopter mode, with the engines clutched to the rotor, resulting in a hybrid helicopter-autogyro aeroplane aircraft; the direct or reverse transition to aeroplane mode may be made from both a helicopter and an autogyro operating mode.

BRIEF DESCRIPTION OF THE DRAWINGS

A preferred embodiment, albeit not an exclusive one, of the convertible aircraft and the method of the invention is described in detail below; for a better understanding thereof, some illustrative drawings are attached, provided merely as an example and not limited thereto. In said drawings.

DETAILED DESCRIPTION OF THE DRAWINGS

The above-mentioned drawings show the composition and the operating mode of the convertible aircraft 1 of this invention.

The convertible aircraft 1 of the invention is a hybrid aircraft between a helicopter, an autogyro and a fixed wing aeroplane. The convertible aircraft 1 comprises a fuselage 2, standard fixed wings 3 equipped with ailerons, a standard tail unit 4 with rudders, propulsion engines 5, a rotor 6 with blades 7, 8, a transmission between propulsion engines 5 and the rotor 6, equipped with braking and the rotor 6 clutch means, a landing gear 9, transition means from helicopter mode to autogyro mode and vice versa, means for the direct and reverse transition from autogyro helicopter mode to aeroplane mode, which are described further below, and pressurisation and heating means for cockpit 12.

Figure 1:
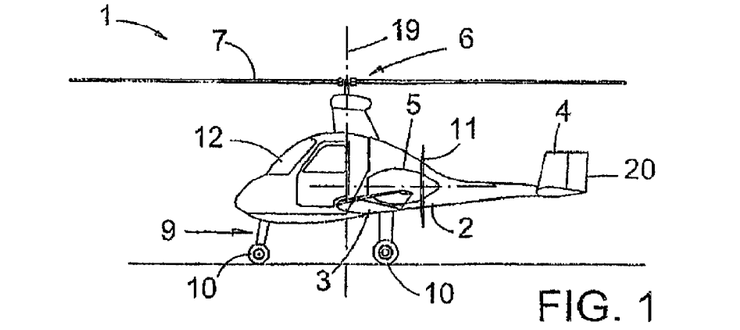
FIG. 1 is a side elevational view of a convertible aircraft according to this invention, with the rotor blades deployed for operation in autogyro or helicopter mode, and with the landing gear deployed.
Figure 3:
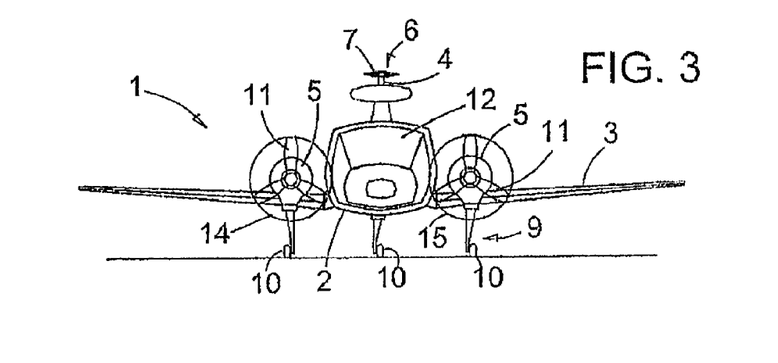
FIG. 3 is a side elevational view of the aircraft in FIG. 1.

In the example of the convertible aircraft 1 shown, the latter comprises a landing gear 9 formed by three retractable wheels 10, as shown in FIGS. 1 and 3, although it may also be formed by fixed or "semi-retractable" skis.

In an embodiment, the convertible aircraft 1 shown in the drawings is a machine with two propulsion engines 5 which always operate at constant velocity and move two variable-pitch propellers 11. The propellers 11 may have a negative pitch. Furthermore, propulsion engines 5 are connected to the rotor 6 by means of a transmission equipped with a brake and a clutch.

The lift for a range of "negative" or low velocities (typically between 0 and 150 km/h), is produced by means of the rotor 6, the rotational axis whereof has been represented by numerical reference 19, and the convertible aircraft 1 operates in rotary wing mode, that is, in helicopter mode or autogyro mode, whereas for higher velocities the lift is performed by means of the fixed wings 3, for flight in aeroplane or fixed wing mode. The lift may also be produced, for a given range of intermediate velocities, by means of wings 3 and the rotor 6 in autogyro mode, simultaneously.

The convertible aircraft 1 of the invention may take off and land on "rotary wings", that is, in both autogyro mode and helicopter mode, with propulsion engines 5 clutched to the rotor 6, and the direct or reverse transition to aeroplane mode may be made from both helicopter mode and autogyro mode.

Figure 2:
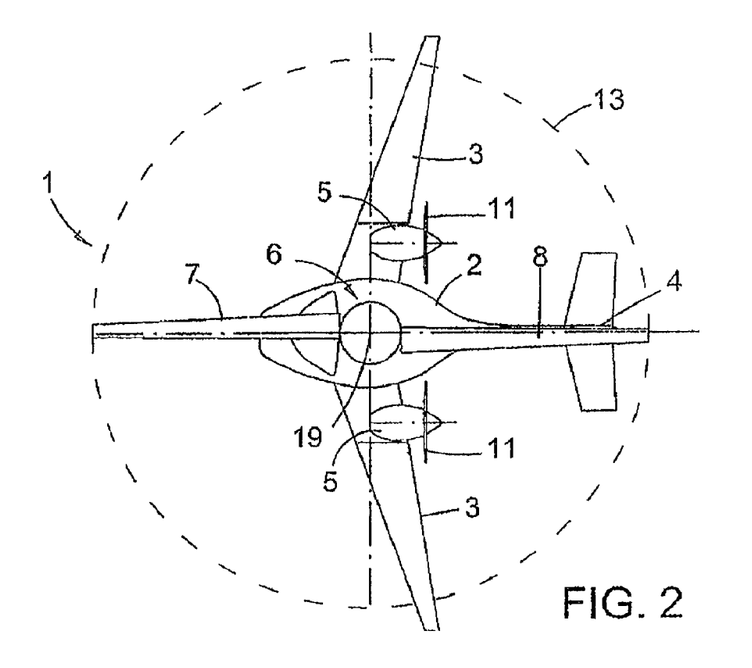
FIG. 2 is an upper plan view of the aircraft in FIG. 1.

FIGS. 1 to 3 illustrate a convertible aircraft 1 according to this invention, with blades 7, 8 of the rotor 6 deployed for operation in autogyro or helicopter mode, and with the landing gear deployed. Circles 13, 14 and 15 shown in the plan and front view indicate that the rotor 6 and the propellers 11 are rotating in one of these two flight modes (rotary wing flight modes). They also indicate the trajectories of the tips of blades 7 of the rotor 6 and the propellers 11.

Figure 4:
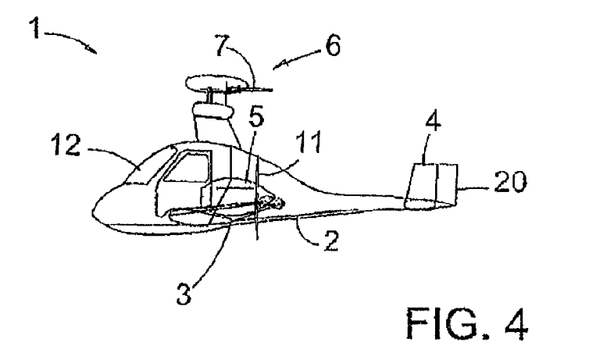
FIG. 4 is a side elevational view of a convertible aircraft according to this invention, with the rotor blades rotating and deployed towards the stern, for operation in fixed-wing aeroplane mode, and with the landing gear retracted.
Figure 5:
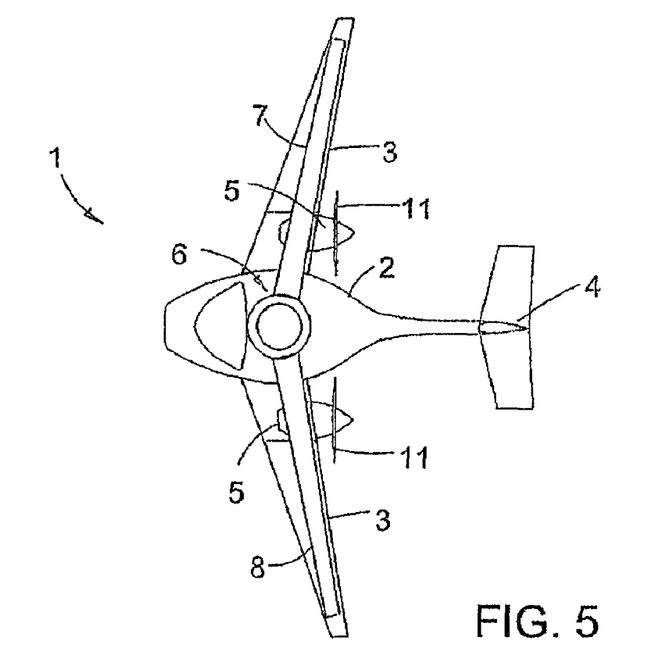
FIG. 5 is an upper plan view of the aircraft in FIG. 4.
Figure 6:
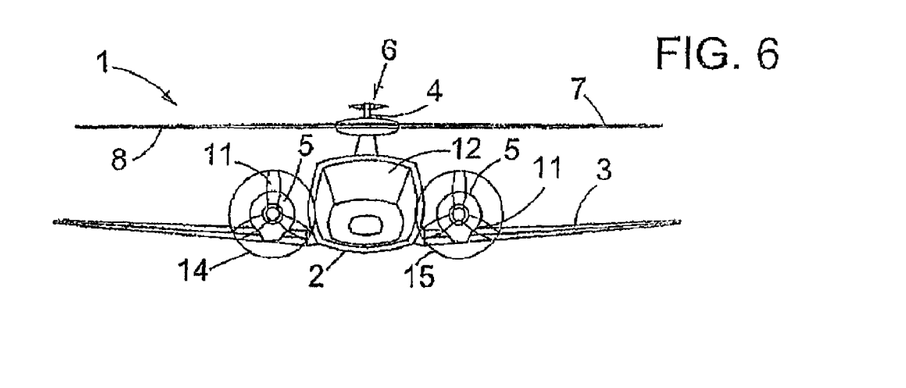
FIG. 6 is a side elevational view of the aircraft in FIG. 4.

FIGS. 4 to 6 show the convertible aircraft 1 with blades 7, 8 of the rotor 6 rotating and deployed towards the stern, for operation in fixed wing aeroplane mode, and with landing gear 9 retracted. In this flight mode the rotor 6 is stopped, as shown by the absence of circles in FIGS. 4 to 6. The propellers 11 obviously continue to rotate.

The rotor 6 of the convertible aircraft 1 that is illustrated as an example, but not limited thereto, has two retractable-type blades 7 and 8, both on land and in flight, which have a symmetric aerodynamic profile with respect to the chord of the blade's aerodynamic profile, and a variable chord, the chord being greater at the root than at the tip of the blades, as may be seen in FIGS. 2 and 5. Advantageously, the ratio between the thickness and the chord of the blades' aerodynamic profile is between 0.1 and 0.2; more specifically, the blades' profile is advantageously of the NACA 0012 type or another symmetric type. The rotor 6 is articulated in standard flapping mode on the blades' longitudinal axis, in order to change the pitch thereof both cyclically and collectively.

Each blade 7 and 8 of the rotor 6 may rotate around vertical axes equipped with a respective first engine 17 (FIG. 7), for example servoengines, known as "fly-by-wire", which are described further below. Each of the blades' longitudinal axes is equipped with a second respective engine 18, for example servoengines, also governed by the "fly-by-wire" system. This type of blades 7, 8, which are retractable on land, makes it possible to fold the blades and obtain minimal dimensions for aircraft 1, such that it may fit in aeroplane carrier lifts or in small hangars.

Figure 7:
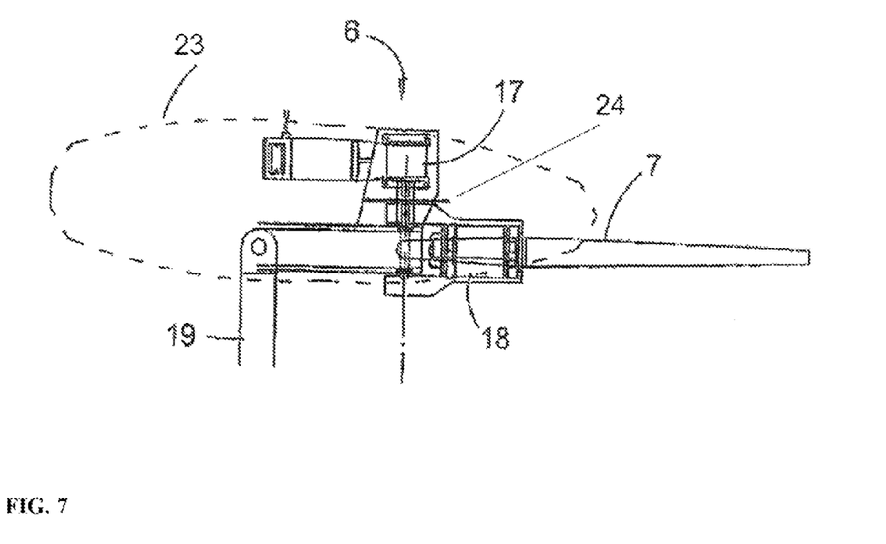
FIG. 7 is an elevational view which schematically shows mechanical elements of the transition means located on the roots of the rotor blades.
Figure 8:
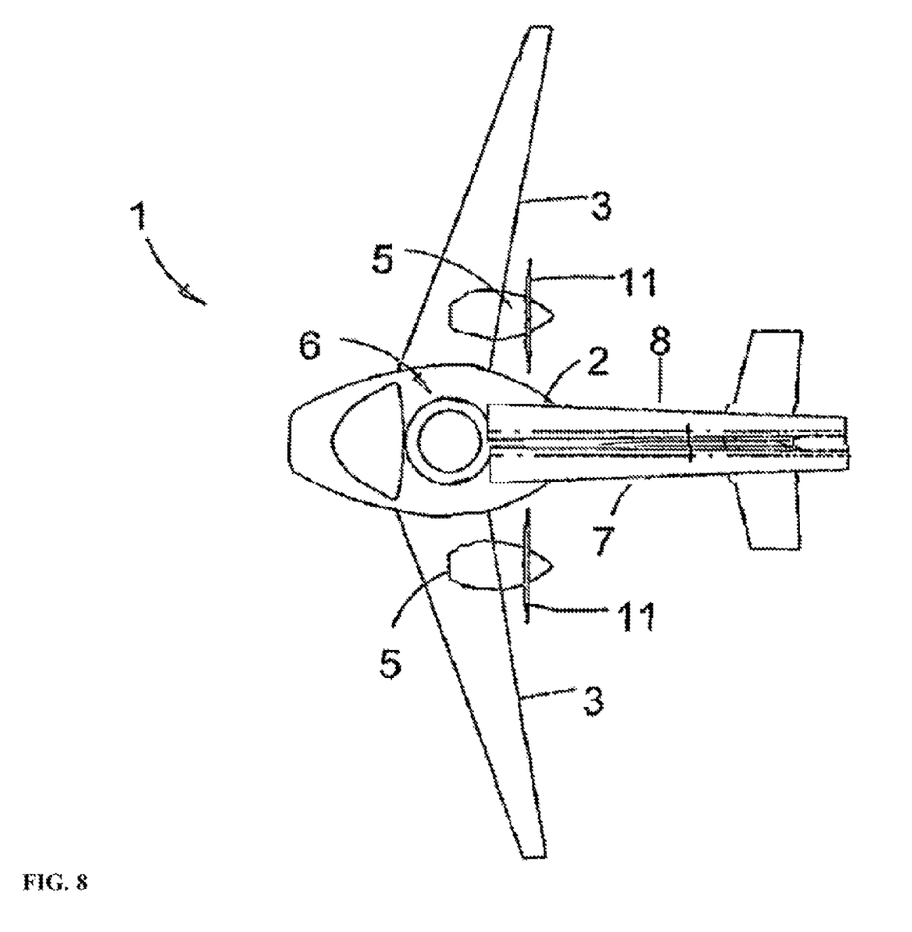
FIG. 8 is an upper plan view of the aircraft with the rotor blades retracted.

FIG. 7 shows that the above elements are enclosed in a shroud 23.

Blades 7, 8 of the rotor 6 of the convertible aircraft 1 of this invention are also retractable in flight, as described further below.

The clutch of the transition means from helicopter mode to autogyro mode and vice versa is uncoupled for passage from helicopter mode to autogyro mode, such that the rotor 6 goes on to self-rotate, and is coupled for passage from autogyro to helicopter mode, wherein the rotor 6 is driven by propulsion engines 5.

The means of direct and reverse transition from autogyro helicopter mode to aeroplane mode comprise additional regulation means for the cyclic and collective pitch of blades 7, 8 of the rotor 6, located on the rotor 6, which make it possible to adjust said pitches to zero, in order to eliminate the lift of the rotor 6 in aeroplane mode.

In this embodiment, regulation of the collective pitch is executed by means of the second servoengines 18, replacing the standard distributor plate, known in the aeronautical field as "swash plate", which consists of a set of elements that controls the pitch of the rotor blades, with a fixed lower element controlled by the pilot or by the "fly-by-wire" system, and an upper element, which rotates with the rotor joined to the blades' pitch control arms.

The means for direct and reverse transition from autogyro helicopter mode to aeroplane mode also comprise a brake included with the transmission (24), which is adapted to completely stop the rotation of the rotor 6 in aeroplane mode.

This brake may be a standard brake, for example a disc brake, of the type normally used in the automotive industry.

A suitable mechanism, combined with the brake mechanism, makes it possible to stop blades 7, 8 of the rotor 6 in a position transverse to the direction of flight, for the direct transition from autogyro helicopter mode to aeroplane mode.

The means for direct and reverse transition from autogyro helicopter mode to aeroplane mode comprise the above-mentioned first servoengines 17, which have a vertical rotational axis, and the above-mentioned second servoengines 18, which have a horizontal rotational axis.

The first servoengines 17 are adapted to retract blades 7 and 8, independently one from another, towards the stern of the aircraft 1 until their longitudinal axis is aligned with the direction opposite that of the movement of the aircraft 1, during the direct transition from autogyro helicopter mode to aeroplane mode.

The first servoengines 17 also make it possible to rotate at least one of blades 7 or 8 of the rotor 6 to approximately 180° on its pitch axis and deploy the rotating and the non-rotating blades, independently from one another, to an azimuthal position determined by a pre-determined range of angles, during direct transition.

Preferably, said pre-determined range of angles is between 30 and 90°.

The first servoengines 17 are also adapted to adjust, by means of an additional vertical rotation, the angle of attack of deployed rotating blades 7, 8, in such a way that they are placed on the aircraft's standard fixed wings 3, parallel thereto, in biplane mode, approximately as shown in FIGS. 4 to 6.

It is well-known that the most pressing issue in the design of hybrid aircrafts is addressing pilotage difficulties, especially during lift transitions from the rotor to the wings and vice versa. It is obvious that the aerodynamic flow which generates the lift completely changes during the transition stages from one flight mode to another. Therefore, an expert pilot is needed who is capable of executing quickly, precisely and without any error whatsoever the successive actions on the aircraft controls required to change the flight mode. The aircraft's behaviour during the intermediate stages of the transition may be counterintuitive, which once again requires great training and ability on the part of the pilot.

In order to resolve the pilotage issue, the convertible aircraft 1 described makes ample use of a recent technology that is known as "fly-by-wire" or, more generally, "fly-by-wire". "Fly-by-wire" technology consists of replacing the mechanical elements of the aircraft's control system (levers, bars, pulleys, gears, cables, etc.) by groups of sensors for the controls and actuators for the control elements, all managed by redundant digital computers and a suitable programme. All the elements, computers, sensors and actuators are linked by a digital data transmission system, preferably based on fibre optic cables.

The "Fly-by-wire" technologies are broadly mentioned in Internet. Some addresses are:
  http://www.vmars.tuwien.ac.at/projects/xbywire/docs/synthesis.doc
  http://dutera.et.tudelft.nl/~crweb/research/node6.html
  http://42 volt.dupont.com/en/Systems/bywire_main.html Therefore, the "fly-by-wire" system is a control system for the various stages of the different transitions, which are explained further below, that is free from manipulatable mechanical elements between the control levers and the aircraft's control elements, wherein the various stages of the different transitions are programmable and automatically executed, and equipped with redundant safety elements, consisting of redundant computers, sensors and actuators.

Regarding the aircraft's propulsion engines 5, in the preferred embodiment, based on propulsion engines 5 driving variable-pitch propellers 11, they are located on the stern with respect to standard fixed wings 3, as shown in the drawings.

Alternatively, propulsion engines 5 may be piston, gas turbine or jet engines.

As has been explained, the convertible aircraft 1 of the invention is a hybrid helicopter-autogyro aeroplane aircraft, and may operate in all three modes. Below we describe the different operating modes and the different transitions of the convertible aircraft 1 according to the invention.

In the first place, we describe the operating mode in Helicopter mode.

The take-off, the landing and the flight of the convertible aircraft 1 at very low velocities (0 to 40 km/h) is done in Helicopter Mode. In this Mode, propulsion engines 5 are clutched to the rotor 6, and the couple of forces necessary to prevent the rotation of the fuselage 2 is created by the two propellers 11, which, in this flight mode, generate a differential thrust in order to originate this couple. Thus, in stationary flight without relative wind, the propellers 11 generate equal, opposite thrusts, one forward and the other backwards; to this end, one of the propellers uses a negative pitch. In slow forward flight, longitudinal and lateral movements are controlled by acting on the cyclic and collective pitches of the rotor 6 and the pitches of the propellers 11, and directional movements are executed by changing the differential thrusts of the propellers 11, which continue to generate a couple of forces to compensate for the couple applied by propulsion engines 5 to the rotor 6. Under these conditions, the convertible aircraft 1 behaves as a helicopter with a high level of authority in the six control dimensions, the three longitudinal and the three angular ones.

At these low velocities, the fixed wings 3 contribute little or nothing to the lift of the aircraft 1 in the air. In fact, they are parasitic elements which reduce the lift of the rotor 6, since they are inserted in its aerodynamic flow.

Below we describe the Autogyro Mode and the transition from Helicopter mode to Autogyro mode.

When the convertible aircraft 1 acquires an illustrative velocity of about 40 km/h, the rotor 6 is declutched from propulsion engine 5 and the cyclic and collective pitches of the rotor 6 are adjusted in order that the latter may self-rotate. The thrust of both propellers 11 becomes equal, since, upon declutching the rotor 6, the couple that makes it rotate in Helicopter mode disappears. Under those conditions, the convertible aircraft 1 flies like an autogyro until it reaches an approximate velocity of about 150 km/h. Under these conditions, the fixed wings 3 slightly contribute to the lift of the aircraft 1, but are no longer a parasitic element, as in the Helicopter Mode, which helps to increase the flight efficiency of the aircraft 1.

A reverse transition takes place when the mode is changed from Autogyro mode to Helicopter Mode.

Those skilled in the art will note that the convertible aircraft 1 may take off and land in Autogyro Mode if the pilot so desires, although this may require short take-off and landing runs. But the Autogyro makes it possible to land with propulsion engines 5 stopped without the danger of loss of velocity ("stall"), which significantly increases the safety of the convertible aircraft 1 of this invention.

Flying in—Mode also improves the aerodynamic performance of a typical flight of the convertible aircraft 1.

Below we describe the transition from autogyro or helicopter mode to aeroplane mode.

When the convertible aircraft 1 reaches a velocity of about 150 km/h, either with blades 7, 8 of the rotor 6 rotating thanks to the transmission or self-rotating, the effects of the rotor's asymmetric lift begin to appear. But, at this velocity, the lift generated by the fixed wings 3 of the machine 1 are already capable of maintaining aircraft 1 in horizontal flight. In order to prevent the undesirable effects and the high drag of the rotor 6 at velocities greater than the transition velocity, the convertible aircraft 1 makes the transition to Aeroplane Mode by executing the following sequence of operations, which are peculiar to and characteristic of this invention:

1.—Retracting retractable landing gear 9.
2.—Adjusting the collective and cyclic pitches of blades 7, 8 of the rotor 6 to substantially zero degrees, such that they cease to lift and control aircraft 1. The necessary control stresses for the flight are now generated by the ailerons of the fixed wings 3 and of the rudders 20, as in a standard aeroplane.
3.—Quickly reducing the rotational velocity of the rotor 6 using the brake thereof, until it is completely stopped in a transverse position with respect to the direction of flight. Note that, under these conditions, the air flow through the blade of the rotor 6 that is stopped in the position opposite to the forward velocity is negative (that is, the air flow enters through the output edge of the stopped blade 7, 8). Blades 7, 8 of the rotor 6 are designed in such a way that they easily resist the stresses generated by this negative flow. Hence the fact that the chord at the root is greater than the chord at the tips, as shown in FIGS. 2 and 5.
4.—Retracting both blades 7, 8 towards the stern of the aircraft 1 until their longitudinal axis is aligned with the direction opposite that of the movement of the convertible aircraft 1. The aerodynamic flow is now aligned with the longitudinal axes of both blades 7 and 8.
5.—Rotating the blade or blades 7, 8 which had a reverse air flow when deployed 180° on the pitch axis.
6.—Deploying both blades 7, 8 forward about a yaw axis until they reach an azimuthal position of about 30° to 60°. Note that now, following Step 5 of this manoeuvre, the air flow in both blades 7, 8 is correctly oriented with respect to the velocity vector of the convertible aircraft 1. A view of the convertible aircraft 1 in its aeroplane configuration is shown in FIGS. 4 to 6.
7.—Adjusting the angle of attack of blades 7 and 8, which now act as the high wings of a biplane (see FIGS. 4 and 6), in order that they generate a small lift that leads to an optimal Lift/Drag ratio for each flight velocity, altitude, etc.
8.—During the entire transition, steering the convertible aircraft 1 using its aerodynamic elements, that is, the rudders 20 of the tail unit 4, the ailerons of the fixed wings 3 and the pitch of the propellers 11.
9.—Operating the pressurisation and heating systems of the cockpit 12 and rising until comfortably flying at the optimal altitude for the desirable flight velocity that is compatible with the air traffic control instructions.

It is evident that, during stages 3 and 4 of this transition, the negative flow on one of blades 7 or 8 of the rotor 6 will produce undesirable vibrations and instabilities. The same may occur at the end of stage 2. Consequently, these transition stages must be executed firmly and quickly, and blades 7 and 8 of the rotor 6 must be designed in such a way that they resist the stresses generated by these vibrations and instabilities. Likewise, the "Fly-by-wire" system programme that executes these transitions must fulfil them as quickly as possible, since there are no mechanical elements between the control levers and the aircraft's control elements.

The selection, dimensions, power and torque of the necessary actuators to execute this manoeuvre shall be experimentally selected and verified using this criterion, both in aerodynamic tunnel and in test flights.

Once the transition-to-aeroplane manoeuvre is successfully executed, the convertible aircraft 1 must rise to the most suitable altitude to optimise its flight characteristics as an aeroplane; to this end, the cockpit shall be pressurised and heated in order to maintain it within a comfortable inner temperature and atmospheric pressure range. During this rise and cruise flight, the pertinent requirements by the air traffic control authorities shall also be taken into consideration.

Below we describe the aeroplane operating mode of the convertible aircraft 1 of this invention.

The appearance of the convertible aircraft 1 in flight in Aeroplane Mode is shown in FIGS. 3 to 6. The flight of the convertible aircraft 1 in Aeroplane Mode is controlled by means of standard aerodynamic actuators, such as the rudders 20 and ailerons, and by controlling the pitch of the pusher propellers ("pushers").

Those skilled in the art will note that the rotor 6 is now stopped with blades 7 and 8 in a position that is approximately or completely transverse. Both blades 7, 8 have the leading edge in the correct position in relation to the translational movement of the aircraft 1. The landing gear 9 is retracted and machine 1 exhibits a clean profile in the forward direction. This clean aerodynamic profile, free from rotational components, helps to reach the high translational velocities of the convertible aircraft 1 of this invention.

Regarding reverse transitions, it is clear that the convertible aircraft 1 must execute transitions in a reverse sequence from that described thus far in order to return to flying first as a Autogyro and then as a Helicopter, prior to landing. It is not necessary to describe these transitions, since they are exactly the opposite of those described, and are executed within the same velocity ranges, albeit now in decreasing order.

Now that the flight Modes and the transitions between them have been described, the significance of the "Fly-by-Wire" technology control system of the convertible aircraft 1 of this invention is clearly observed. One must remember that, in the Convertiplanes designed thus far, the transitions were performed, almost without exception, without this technology. But those transitions had to be executed by pilots with a huge experience and following a slow learning process which in many cases was self-learning. One can easily understand the great ability and training needed by a pilot in order to follow this complex sequence of operations with the greatest precision and velocity and without any type of errors, and the great risk entailed thereby.

In the case of the convertible aircraft 1 of the invention, and thanks to the "Fly-by-Wire" technology, the complex transition manoeuvres will simply be programmed in the system's central computers, where, in addition, they will be optimised for all the parameter variations in each flight, such as "Payload", amount of fuel, altitude and ambient temperature, transition velocity and many others. With these data, the pilot will only need to give the control system the order to execute the transition by pressing a suitable button, and the programme will be responsible for perfectly executing the sequence of operations that is required in each case. Furthermore, execution of the transition could even be initiated in a fully automatic manner when the pilot indicates, by means of the standard flight controls, that s/he wishes to change the velocity of the convertible aircraft 1 above or below each transition velocity.

In sum, the convertible aircraft 1 of this invention is a hybrid aircraft (or "convertiplane") between a helicopter, a autogyro and a fixed wing aeroplane, which is a complete novelty. It is capable of vertically landing and taking off, flying at relatively low speeds in the same way as a helicopter, including stationary flight ("hovering"), and, by changing its flight mode, it may reach maximum speeds of about 600 km/h, which are comparable to those of fixed wing aeroplanes propelled by propellers. Moreover, the convertible aircraft 1 of this invention may fly with great efficiency, with specific consumptions which are comparable to those of a helicopter in slow flight (from zero to about 150 km/h) and those of an aeroplane in flight at high velocities.

Except with regard to maximum flight velocities, all the transition velocities mentioned in this description are approximate, illustrative and not limited thereto. The velocities whereat the convertible aircraft 1 of the invention will execute the transitions shall be determined during the aerodynamic tunnel and flight trials, and calculated during the aerodynamic and structural design of the aircraft and the rotor thereof.

Having sufficiently described the nature of this invention, as well as how to implement it, we specify that anything that does not alter, change or modify its main principle is subject to variations in detail, and the different elements or components may be replaced by their technical equivalents.

The invention claimed is:

1. Operating method for a convertible aircraft (1), equipped with a fuselage (2), standard fixed wings (3) with ailerons, a tail unit (4) with rudders (20), propulsion engines (5), a rotor (6) with blades (7, 8) located at approximately the center of the fuselage in between the wings, a transmission between the engines and the rotor equipped with a brake and a clutch, and a landing gear (9), the method comprises direct and reverse transitions from a helicopter mode to an autogyro mode and from an autogyro-helicopter mode to an aeroplane mode, the direct transition from the helicopter mode to the autogyro mode comprising the following step:

declutching the rotor from the propulsion engines;

the direct transition from the autogyro-helicopter mode to the aeroplane mode comprising the following steps:

adjusting the collective and cyclic pitches of the blades (7, 8) of the rotor (6) to essentially zero degrees, in such a way that they cease to lift and control the aircraft (1) and the latter is lifted by the standard fixed wings and controlled by the ailerons and the rudders (20);

quickly reducing the rotational velocity of the rotor (6) using a brake (24) thereof; characterized in that the method also comprises stopping the rotor in a transverse position of at least two of its blades (7, 8) in a position essentially transverse to the direction of flight;

retracting the rotor blades towards a stern of the aircraft, until their longitudinal axes are parallel to the fuselage (2) of the aircraft;

rotating the blade which had a reverse air flow when the blades were stopped transversely to the direction of the flight to approximately 180° on its pitch axis;

deploying the rotating blades, independently from one another, to an azimuthal position determined by a predetermined range of angles;

adjusting the angle of attack of the deployed blades until the blades are deployed in a position parallel to the fixed wings; and the reverse of each of these transitions accomplished by executing each of the above steps in reverse sequence.

2. Method, according to claim 1, characterised in that said step of adjusting the angle of attack of the deployed rotating blades (7, 8) such that each blade is parallel to one of the fixed wings and traverse to a forward direction of the aircraft thus transitioning into a biplane wherein the rotor blades now form upper wings and the fixed wings form the lower wings.

3. Convertible aircraft (1), of the type that comprises a fuselage (2), fixed wings (3) with ailerons, a tail unit (4) with rudders (20), propulsion engines (5), a rotor (6) with blades (7, 8) located at approximately the center of the fuselage in between the wings, landing gear, the aircraft comprising:

a means to transition from helicopter mode to autogyro mode;

a means for the direct transition from autogyro-helicopter mode to aeroplane mode, including:

a second servo-engine (18) for the regulation of the collective and cyclic pitches of the blades (7, 8) of the rotor (6) to essentially zero degrees, in such a way that they cease to lift and control the aircraft (1) and the latter is lifted and controlled by the ailerons and the rudders (20);

a means to stop the rotors (24);

a first servo-engine (17) to retract and deploy the rotor blades both towards and away from the stern of the aircraft, to position the blades essentially perpendicular to the fixed wings and when needed parallel to the fixed wings, and to deploy the blades to an azimuthal position determined by a pre-determined range of angles; and to rotate at least one of the rotor blades to approximately 180° on its pitch axis; when needed to rotate the blades such that each blade now form upper wings and the fixed wings form the lower wings.

4. Convertible aircraft (1), according to claim 3, characterised in that the blades (7, 8) of the rotor (6) are designed in such a way that the chord at the root is greater than the chord at the tips.

5. Convertible aircraft (1), according to claim 3, characterised in that said propulsion engines (5) are engines with propellers (11).

6. Convertible aircraft (1), according to claim 5, characterised in that the propellers (11) are placed astern of the fixed wings (3).

7. Convertible aircraft (1), according to claim 5, characterised in that said propellers (11) have a variable pitch.

8. Convertible aircraft (1), according to claim 3, characterised in that said propulsion engines (5) are piston, gas turbine or jet engines.

9. Convertible aircraft according to claim 3 further comprising:

wherein the means to transition from helicopter mode to autogyro mode are also—a means to transition from autogyro mode to helicopter mode; and wherein the means for the direct transition from autogyro-helicopter mode to aeroplane mode are also—a means to transition from aeroplane mode to autogyro-helicopter mode.

* * * * *